US008462155B1

(12) United States Patent
Allen et al.

(10) Patent No.: US 8,462,155 B1
(45) Date of Patent: Jun. 11, 2013

(54) MERGING THREE-DIMENSIONAL MODELS BASED ON CONFIDENCE SCORES

(75) Inventors: Brett Allen, San Francisco, CA (US); Aleksey Golovinskiy, Mountain View, CA (US); Tilman Reinhardt, Woodside, CA (US); Michael Hongmai Lin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/461,403

(22) Filed: May 1, 2012

(51) Int. Cl.
*G06T 17/00* (2006.01)
(52) U.S. Cl.
USPC .......................................... 345/420; 345/424
(58) Field of Classification Search
None
See application file for complete search history.

(56) References Cited

U.S. PATENT DOCUMENTS

| | | | |
|---|---|---|---|
| 6,912,293 | B1 | 6/2005 | Korobkin |
| 6,970,593 | B2 | 11/2005 | Furukawa |
| 7,193,633 | B1 | 3/2007 | Reinhardt et al. |
| 2005/0128212 | A1 | 6/2005 | Edecker et al. |
| 2005/0212794 | A1 | 9/2005 | Furukawa et al. |
| 2009/0141020 | A1 | 6/2009 | Freund et al. |
| 2009/0244062 | A1 | 10/2009 | Steedly et al. |
| 2011/0096083 | A1 | 4/2011 | Schultz |
| 2011/0187716 | A1 | 8/2011 | Chen et al. |

OTHER PUBLICATIONS

F. Bernardini, I.M. Martin, and H. Rushmeier, "High-Quality Texture Reconstruction from Multiple Scans," IEEE Trans. Visualization and Computer Graphics, vol. 7, No. 4, pp. 318-332, Oct./Dec. 2001.*
M. Goesele, B. Curless, and S. Seitz, "Multi-view stereo revisited," in Proc. IEEE Conf. Comput. Vis. Pattern Recognit., 2006, vol. 2, pp. 2402-2409.*
C. Munkelt, M. Trummer, P. Kühmstedt, G. Notni, and J. Denzler. View planning for 3D reconstruction using time-of-flight camera data. In Proceedings of 31st DAGM Syposium (LNCS 5748), pp. 352-361. Springer-Verlag, Sep. 2009.*
P. J. Narayanan, Peter W. Rander, and Takeo Kanade. Constructing virtual worlds using dense stereo. In Proc. Sixth Int. Conf. on Computer Vision, pp. 3-10, 1998.*
Brian Curless and Marc Levoy. A volumetric method for building complex models from range images. In SIGGRAPH '96, pp. 303-312, 1996.*
Izadi et al., "KinectFusion: Real-time 3D Reconstruction and Interaction Using a Moving Depth Camera," In Proc. UIST (2011), 10 pages.

* cited by examiner

*Primary Examiner* — Kee M Tung
*Assistant Examiner* — Ryan D McCulley
(74) *Attorney, Agent, or Firm* — Sterne, Kessler, Goldstein & Fox PLLC

(57) ABSTRACT

In an embodiment, a method merges a plurality of three-dimensional models, each having been generated from images of a camera having a different viewpoint. For respective voxels in a plurality of voxels, a plurality of distance values are determined. Each determined distance value is a distance from the voxel to a three dimensional model from the plurality of three-dimensional models along a perspective of a camera model used to generate the three-dimensional model. When at least one of the determined distance values indicates that the distance between the voxel and the three dimensional model exceeds a threshold and the voxel is located above the corresponding three-dimensional model, a confidence score is determined indicating a degree to which the perspective of the camera model of the corresponding three-dimensional model is oriented to face the voxel. Based on the determined confidence score, the voxel into a merged three-dimensional model is determined.

21 Claims, 7 Drawing Sheets

MERGING THREE-DIMENSIONAL MODELS BASED ON CONFIDENCE SCORES

BACKGROUND

1. Field

Embodiments generally relate to three-dimensional modeling.

2. Related Art

Photographers often take images of the Earth from altitude, such as from an aircraft. Such aerial photographs can be taken from different perspectives. From the aerial photographs, three-dimensional models may be constructed using, for example, stereo matching. Models constructed using stereo matching may not be entirely accurate. For example, inaccuracies may be introduced due to variations in the underlying images, inaccuracies in the camera perspective, and limitations of the stereo matching algorithms.

The constructed three-dimensional models may have an associated perspective. For example, three-dimensional models may be represented as depth maps from an associated perspective. Each depth map may provide a per-pixel distance between a notional "camera" and the surface of the scene. While depth maps may be able to describe three-dimensional features of surfaces apparent from their associated perspective, depth maps may be unable to describe three-dimensional features that are obscured from their perspective. For this reason, multiple depth maps having different perspectives may be needed to completely describe a three-dimensional scene.

BRIEF SUMMARY

Embodiments merge a plurality of depth maps generated using different viewpoints. In an embodiment, a method merges a plurality of three-dimensional models, each having been generated from images of a camera having a different viewpoint. The method includes determining a plurality of voxels in three-dimensional space. For respective voxels in the plurality of voxels, a plurality of distance values are determined. Each determined distance value is a distance from the voxel to a three dimensional model along a perspective of a camera model used to generate the three-dimensional model. When at least one of the determined distance values indicates that the distance between the voxel and the corresponding three dimensional model is within a threshold or the voxel is located above the corresponding three-dimensional model, a confidence score is determined indicating a degree to which the perspective of the camera model of the corresponding three-dimensional model is oriented to face the voxel, and whether to include a point corresponding to the voxel into a merged three-dimensional model is determined based, at least in part, on the determined confidence score.

System and computer program product embodiments are also disclosed.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
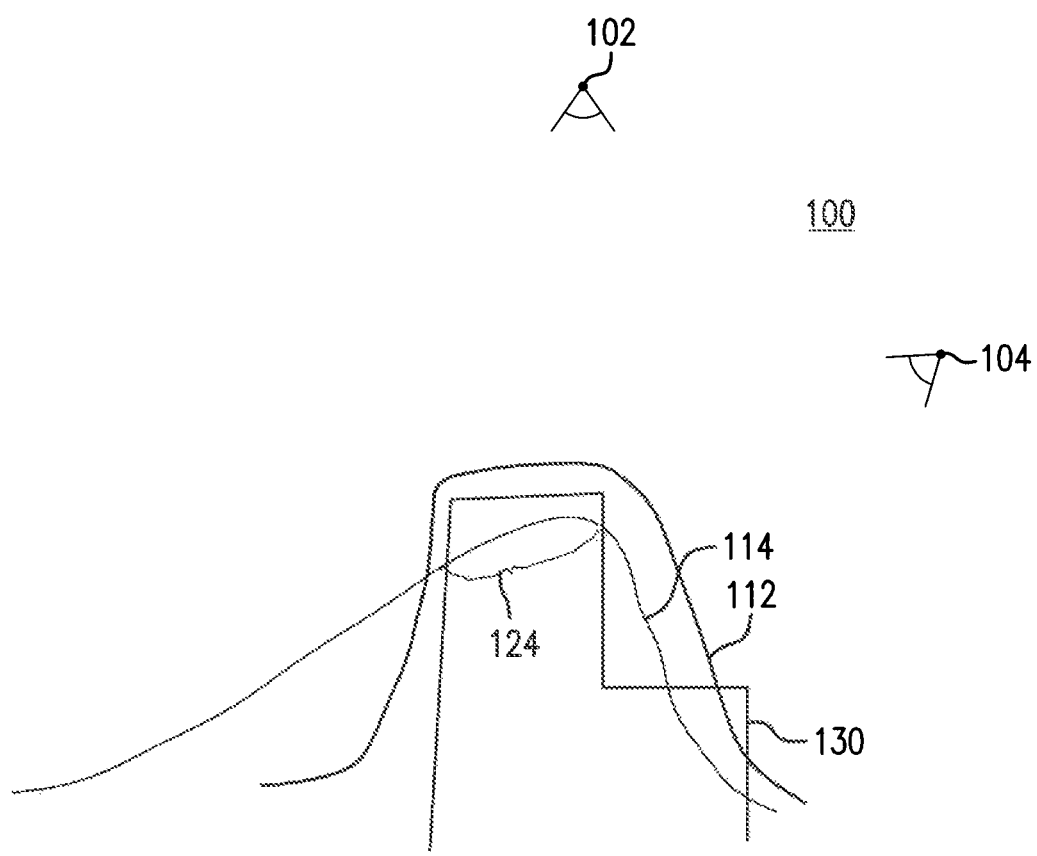
FIG. 1 is a diagram illustrating depth maps of a scene constructed from different viewpoints.

As mentioned above, multiple depth maps having different perspectives may be needed to completely describe a three-dimensional scene. To produce a representation of the entire three-dimensional scene, the multiple depth maps may need to be merged into a single three-dimensional representation. One way to more merge multiple depth maps may be to take an intersection. To take an intersection, any voxel above any measured depth value would be removed. However, this technique may suffer from a drawback. In particular, any erroneous measurements where a depth map indicates that a three-dimensional feature is deeper than it really is may be propagated into the merged depth map.

To account for noise in depth maps, other techniques may average measurements to merge the depth maps. However, as mentioned above, depth maps may only describe three-dimensional features apparent from their associated perspective. Obscured three-dimensional features may not be represented in a depth map at all. Similarly, features that are not facing a depth map's perspective may only be represented in the depth map at a low resolution. Averaging these depth map measurements with measurements from depth maps that have a more direct view of the three-dimensional feature may degrade the accuracy of the merged depth map.

At least in part to deal the shortcomings, embodiments select which depth map measurements to merge into the final three-dimensional model based on a confidence level associated with that measurement.

In one embodiment, the various depth maps may be used to determine a signed distance field including the plurality of voxels. Each voxel in the signed distance field may be evaluated, and, based on how the evaluation, one of three operations may be taken for the pixel to help determine the merged three-dimensional model. First, given a threshold distance "t", when at least one of the signed distance values is less than $-t$, the voxel may be kept empty (e.g., assign it a large negative value). Keeping the voxel empty may carve the voxel out of the merged three-dimensional model. Second, if any of the signed distance values are between $-t$ and $t$, the voxel's signed distance may be set to the average of these values. By taking the average of two values, the two merge depth maps may be merged at that voxel. Third, if any of the signed distance values are greater than $t$, the voxel may be filled (i.e., assign it a large positive value). In this way, each voxel may be carved, merged, or filled to determine a corresponding voxel in the merged three-dimensional model.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the figures illustrate two-dimensional cross-sections for illustrative purposes, a person of skill in the art would recognize that the cross-sections may represent three-dimensional elements.

FIG. 1 shows a diagram 100 illustrating depth maps of a scene constructed from different viewpoints. Diagram 100 illustrates a three-dimensional model 112 constructed from a virtual camera 102 and a three-dimensional model 114 constructed from a virtual camera 104. Both three-dimensional model 112 and 114 may represent a building 130.

Three-dimensional models 112 and 114 may be stereo reconstructions generated from aerial or satellite imagery. Imagery may be taken by overhead cameras at various oblique or nadir perspectives. In the imagery, features are detected and correlated with one another. Using the known perspective information, points in three-dimensional space are triangulated from matched features. These points may be used to determine a stereo mesh from the two images. In this way, three-dimensional model information may be determined from two-dimensional imagery.

However, the three-dimensional model information may also have associated perspective information. For example, three-dimensional model information may be reconstructed from a particular virtual camera. In an embodiment, a stereo mesh determined using stereo reconstruction of at least two images may be projected back to particular camera viewpoint. In embodiments where the three-dimensional model is represented as a depth map, each pixel in the projection may have a value indicating a distance from the notional camera perspective to the stereo mesh at the pixel. In embodiments where the three-dimensional model is represented as a height field, each pixel in the projection may have a value indicating a height of the stereo mesh at the pixel. In either embodiment, three-dimensional model for each stereo mesh itself has associated perspective information. The three-dimensional model may be any other type of surface for which a signed distance may be compute, e.g., a closed mesh, or another signed distance field.

In diagram 100, the perspective information for models 112 and 114 is illustrated by virtual cameras 102 and 104. Each of virtual cameras 102 and 104 may include all information needed to specify a perspective or viewpoint for the corresponding depth map or height field. For example, each virtual camera model may have a corresponding position, orientation, and field of view. Moreover, each virtual camera model may be an orthographic or parallel projection.

To produce a single unified three-dimensional model, embodiments merge three-dimensional model 112 and three-dimensional model 114. As mentioned above, one way to merge models 112 and 114 may be to take the intersection of the two models. However, when this technique is applied, any errors in models 112 and 114 indicating that building 130 is lower than it really is would be propagated to the final merged model. In diagram 100, for example, model 114 indicates that building 130 is lower than it really is at an area 124. If the models were intersected, that error would be propagated to be final merged model. At least in part to avoid this error, embodiments select which depth map measurements to merge into the final three-dimensional model based on a confidence level associated with that measurement. How to determine which depth map measurements to merge into the final three-dimensional model is illustrated in FIG. 2.

Figure 2:
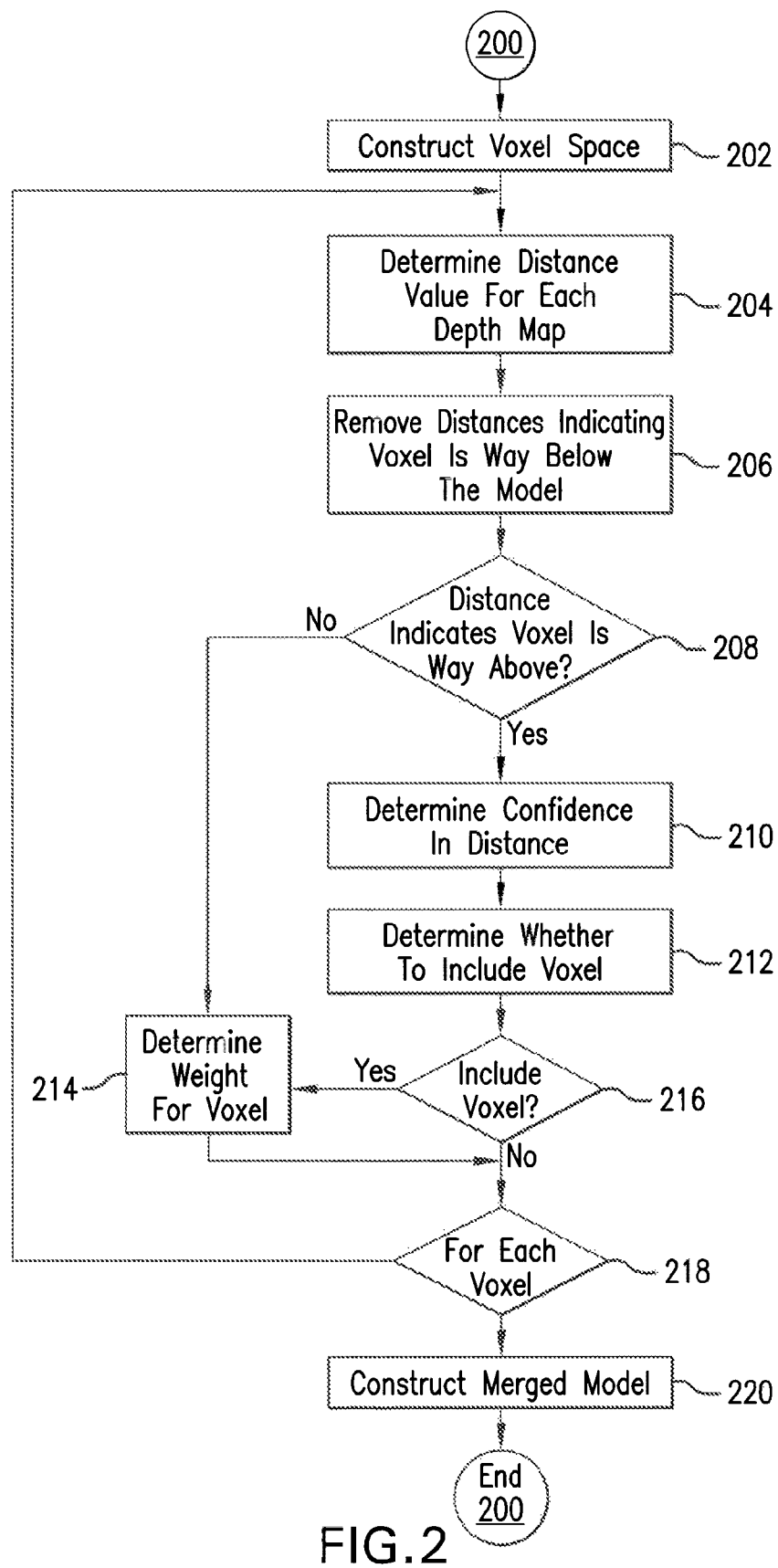
FIG. 2 is a flowchart illustrating a method for merging depth maps, according to embodiments.

FIG. 2 is a flowchart illustrating a method 200 for merging depth maps, according to embodiments. Method 200 is described with respect examples illustrated in FIGS. 3-6.

Method 200 begins at a step 202 with construction of a voxel grid. The voxel grid may be a signed distance field. The voxel grid may be constructed according to a resolution of the input three-dimensional model data or a desired resolution of the merged three-dimensional model. As the resolution of the input or desired output three-dimensional models increases, the voxel grid may be more fine. An example voxel grid is illustrated with respect to FIG. 3.

Figure 3:
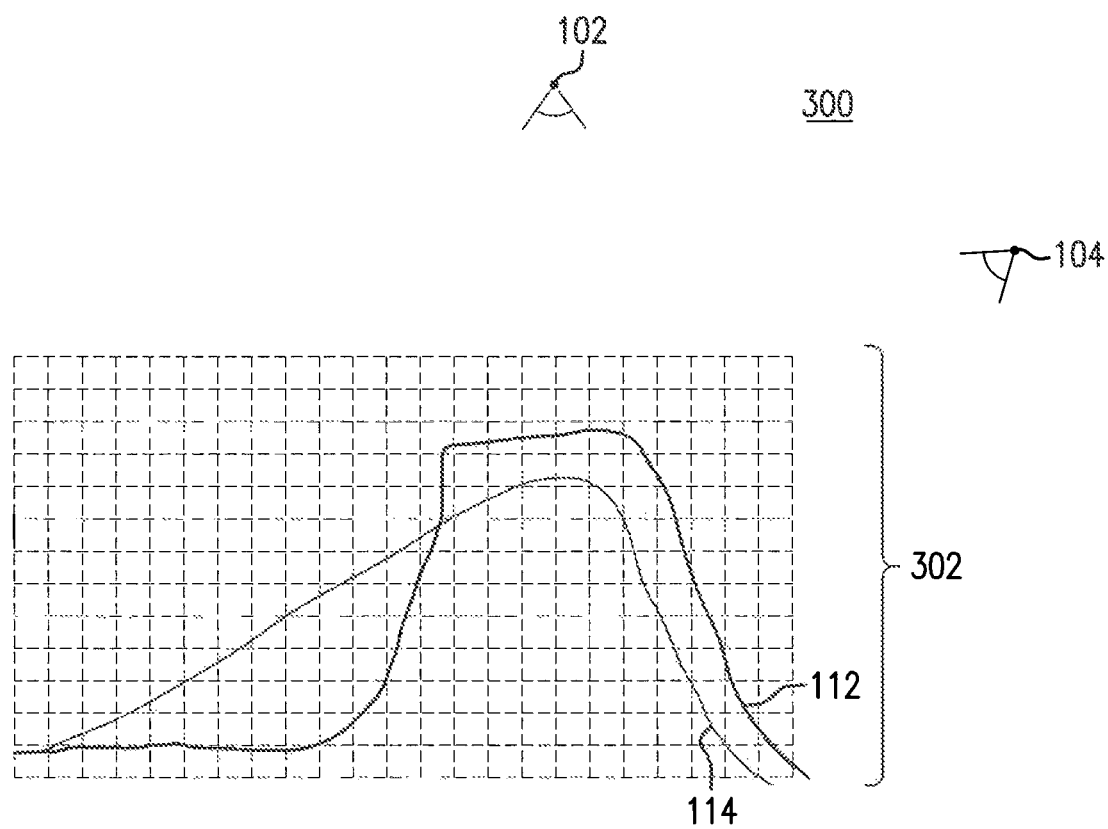
FIG. 3 is a diagram illustrating a voxel grid for the scene in FIG. 1.

FIG. 3 shows a diagram 300 illustrating a voxel grid for the scene in FIG. 1. Each voxel in the voxel grid may have an associated position in three-dimensional space. The voxels may be regularly spaced across the three-dimensional environment. Each voxel in the voxel grid may be evaluated independently as to whether it is part of the merged three-dimensional model.

The voxels in voxel grid in diagram 300 is shown as being regularly space with a continuous resolution. However, a skilled artisan would recognize that other embodiments could involve an adaptive resolution. With an adaptive resolution, instead of sampling at regularly spaced voxels, the sampling points may be more dense close to the surface, but less dense away from the surface. This embodiment may provide more detail with less memory usage. Referring back to FIG. 2, the evaluation of each voxel or sampling point begins at step 204 in method 200.

At step 204, a distance value is determined for each inputted three-dimensional model. Specifically, the distance value may represent the distance between a voxel in the voxel grid and the three-dimensional model. For each inputted three-dimensional model, the distance is measured along a perspective associated with three dimensional model. More specifically, the distance may be measured along a ray from the voxel directly towards or directly away from the virtual camera. When the three-dimensional model is represented as a height field or depth map, the distance determination may involve a simple lookup, making for fast execution.

The distance may be a signed distance value, meaning its magnitude (absolute value) may be the distance between those two points, but it may also be positive or negative. For example, the determined distance value may be positive to indicate that the voxel is located below (or within) the three-dimensional model from the perspective of the virtual camera; and the determined distance value in the negative syndicate the voxel's located above (or outside) the three-dimensional model from the perspective of virtual camera.

Once the distance value is determined for each depth map, any distance values indicating the voxel is far below the model are discarded at step 206. In an embodiment, to determine whether the voxel is far below the model, the distance values may be evaluated to see whether they exceed a threshold value. Distance values that exceed the threshold value are discarded because they could indicate that the voxel is obscured from view given the perspective of the three-dimensional model. While the object is obscured from view from one perspective of the three-dimensional model, other models may be constructed from angles with better views of the voxel. For this reason, large distance values indicating that the voxel is located deep within the model may not provide useful information. This step is illustrated, for example, with respect to FIG. 4A.

Figure 4A:
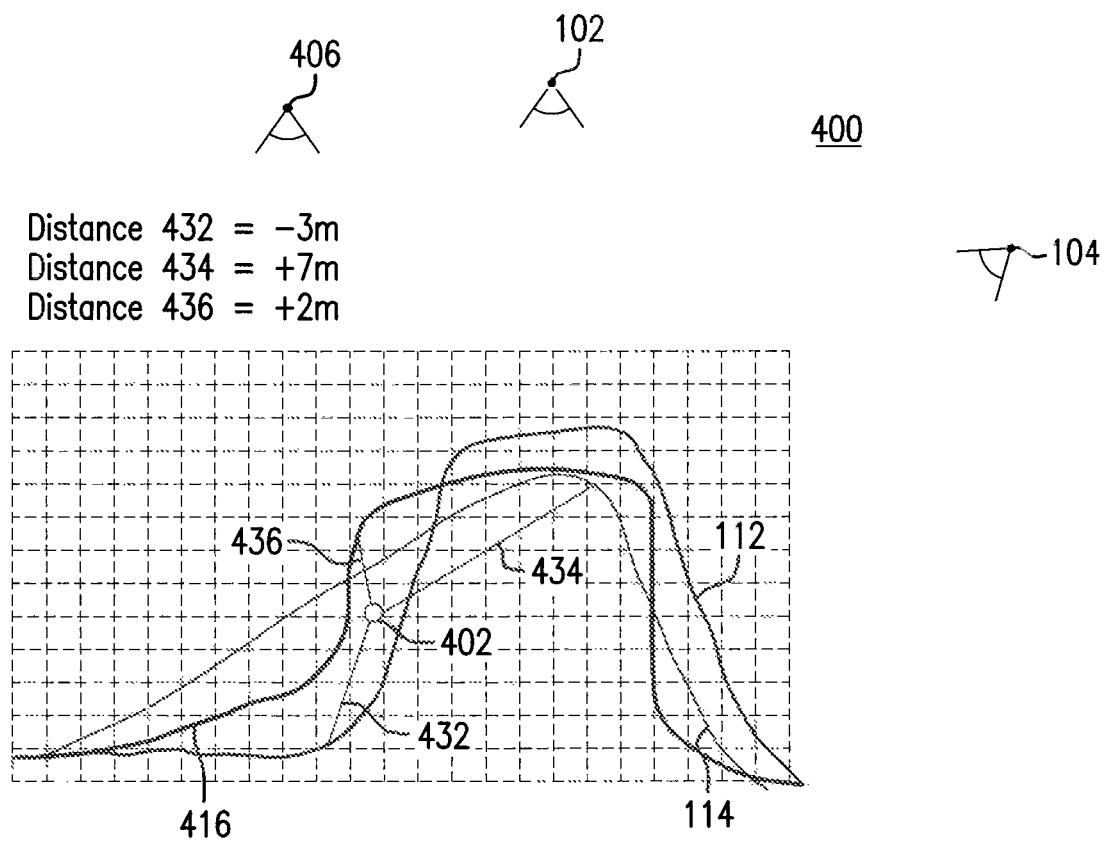
FIGS. 4A-B are diagrams illustrating distance measurements using the voxel grid.

FIG. 4A shows a diagram 400, illustrating various distance measurements for a voxel. Similar to diagram 100 and FIG. 1, diagram 400 shows three-dimensional models 112 and 114 having corresponding virtual cameras 102 and 104. Additionally, diagram 400 shows a three-dimensional model 416 constructed from the perspective of virtual camera 406. Diagram 400 illustrates distance values for each of the three-dimensional models generated for a voxel 402.

In particular, diagram 400 shows a distance 432 for model 112, a distance 434 for model 114, and a distance 436 for model 416. Suppose, for example, the hypothetical threshold distance was 5 m. As illustrated in diagram 400, distance 434 was measured as +7 m, meaning the voxel 402 is 7 m below surface 114. In that example, distance 434 would be disregarded in step 206 of method 200. Distances 436 and 432 will be described in more detail below.

Referring back to FIG. 2, after removing distance measurements deep inside the model in step 206, the remaining distances are evaluated to determine whether the distances indicate that a voxel is far above the model at decision block 208. To determine whether the distance indicates that a voxel is far above model, the distance values may be compared against a negative threshold value. If the distances are below the negative threshold value (the magnitude exceeds the magnitude of the threshold), then the distance indicates that the voxel is far above the corresponding model. Otherwise, the distance does not indicate that the voxel is far above the corresponding model. If no distance measurement indicates the voxel is far above the corresponding model, the method proceeds to step 214, and any measurements that are determined to be far below the surface, e.g. below a threshold, may be discarded. The measurements may be discarded by simply setting a confidence for that measurement to zero. Otherwise, the method proceeds to step 210. An example where the determined distance indicates that a voxel is far above the model is illustrated in FIG. 4B.

Figure 4B:
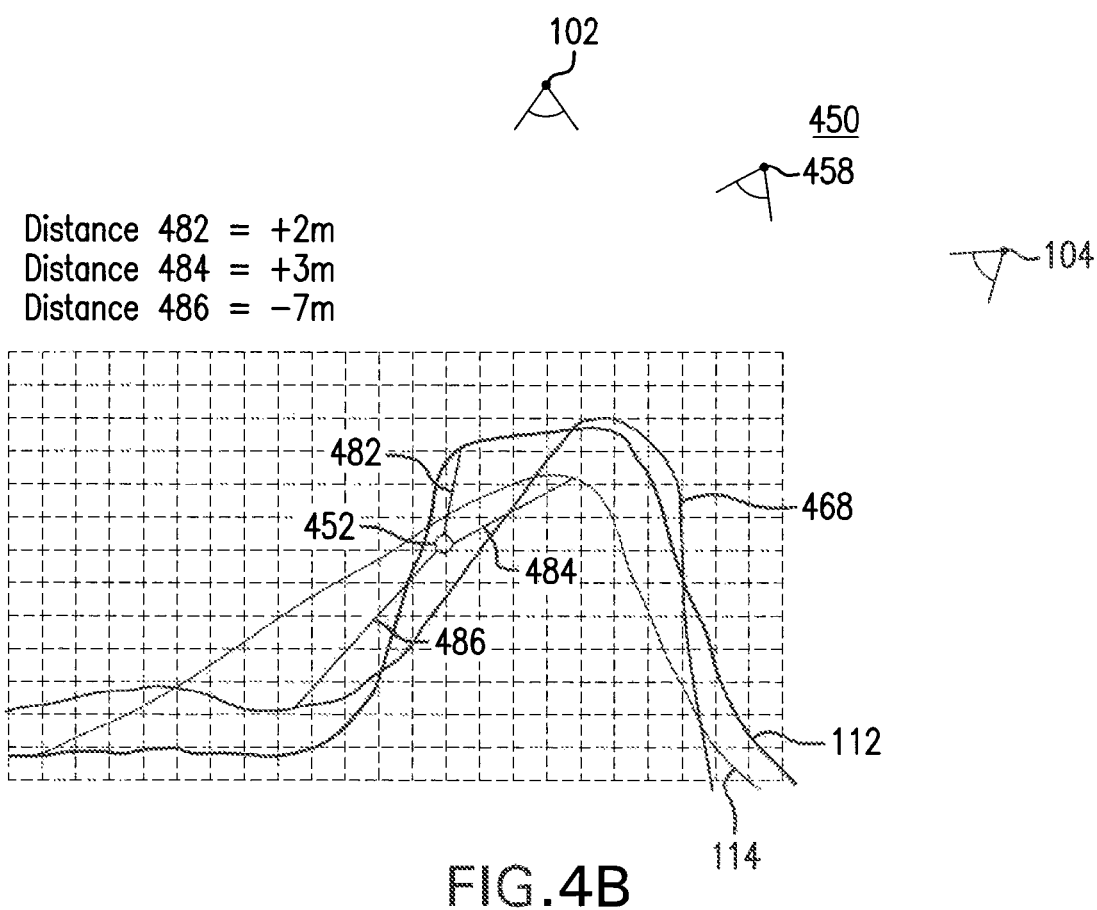

FIG. 4B shows a diagram 450, illustrating various distance measurements for a voxel. Similar to diagram 100 and FIG. 1 and diagram 400 of FIG. 4B, diagram 450 shows three-dimensional models 112 and 114 having corresponding virtual cameras 102 and 104. Additionally, diagram 450 shows a three-dimensional model 468 constructed from the perspective of virtual camera 458. Diagram 450 illustrates distance values for each of the three-dimensional models generated for a voxel 452.

In particular, diagram 450 shows a distance 486 for a model 112, a distance 434 model 114, and a distance 438 for a model 416. Suppose, for example, the hypothetical threshold distance was −4 m. As illustrated in diagram 400, distance 486 was measured as −7 m, meaning the voxel 402 is 7 m below surface 114. In that example, distance 486 would indicate the voxel is far above the three-dimensional model in step 208 in method 200. Consequently, method 200 would proceed to step 210. Distances 436 and 432 will be described in more detail below.

At step 210, a confidence score is determined for that distance. The confidence score may estimate the quality of the distance reading in the depth map. Generally, a more direct, normal view of feature will have higher resolution, and perhaps better quality, than a more tangential view of the feature. For that reason, the confidence score may indicate a degree to which a perspective of the camera model for the corresponding three-dimensional model is oriented to face the voxel area. An example of how to determine a confidence score is illustrated in FIG. 5.

Figure 5:
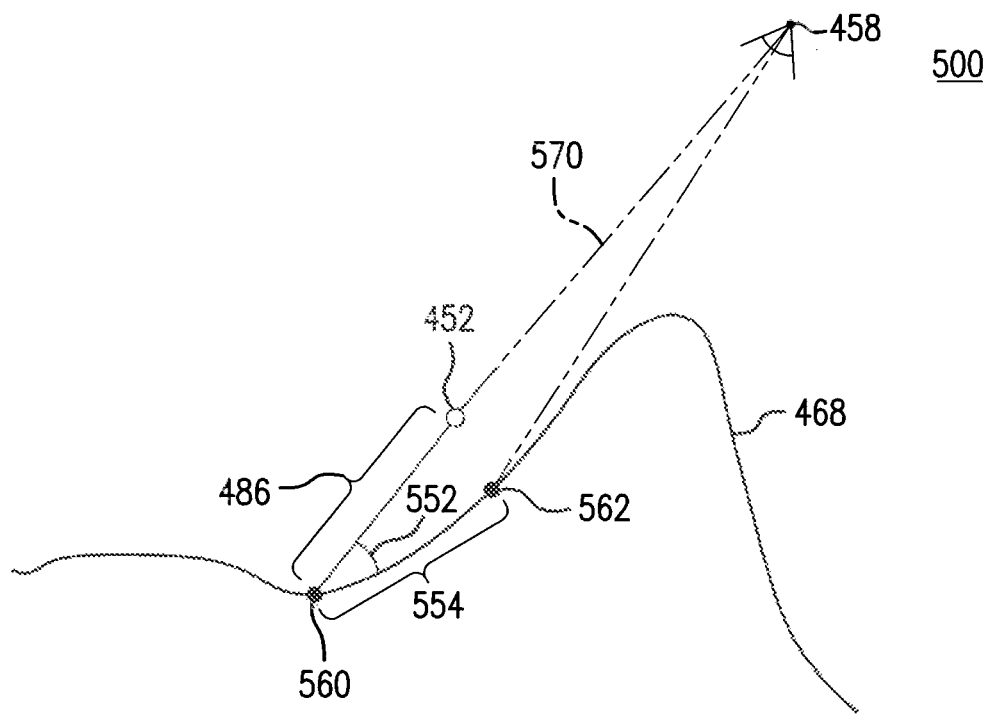
FIG. 5 is a diagram illustrating how to determine a confidence score for distance measurement.

FIG. 5 shows a diagram 500 illustrating how to determine a confidence score for distance measurement. Diagram 500 illustrates how to determine a confidence in distance 486 measured for voxel 452 and three-dimensional model 468, which was constructed from virtual camera 458. A ray 570 extends from virtual camera 458 through voxel 452 to intersect with three-dimensional model 468 at point 560. In embodiments where the three-dimensional model 468 is represented as a depth map or height field, determining the location 560 may include a simple lookup. Between a ray 570 and three-dimensional model 468, an angle 552 may be determined. The determined angle 552 may be used to determine the confidence score. As angle 552 becomes more obtuse, the likelihood of including voxel 452 in the merged three-dimensional model may increase. Similarly, as angle 552 becomes more acute, the likelihood of including voxel 452 in the merged three-dimensional model may decrease. In this way, an angle between the perspective of the virtual camera in the three-dimensional model may be used to help determine the merged three-dimensional model.

In addition to the angle, the frequency of nearby sampling points may also be used to determine the merged three-dimensional model. In diagram 500, three-dimensional model 468 was sampled at point 560. The sampling points adjacent to point 560 may be determined. A distance between the sampling points may be determined, and the confidence score may be determined based on the distance. In diagram 500, point 560 may be adjacent to sampling point 562. Between points 560 and 562, a distance 554 may be measured. The confidence score indicating the level of confidence in distance value 486 may be determined based on the measured distance 554. As distance 554 becomes longer, the likelihood of including voxel 452 in the merged three-dimensional model may decrease. Similarly, as distance 554 becomes shorter, the likelihood of including voxel 452 in the merged three-dimensional model may increase. In this way, both distance 554 and angle 552 may be used to determine a level of confidence in measured distance 486.

In other embodiments, the quality of the stereo match may be used to determine a confidence score. Moreover, the confidence score may be determined using a combination of any of the above-described methods.

In a further example, a weighted average may be used when there are multiple confidence values. For example, referring back to FIG. 4, if distance 482 has a confidence value 0.2, distance 484 has confidence value of 0.5, and distance 46 has a confidence value 0.1, and the aggregate signed distance value that may be stored in the voxel grid for voxel 452 is (2*0.2+3*0.5−7*0.1)/(0.2+0.5+0.1)=1.5.

Referring back to FIG. 2, once a confidence score is determined in step 210, the confidence score is used to determine whether to include the voxel in the merged three-dimensional model at step 212. In an embodiment, step 212 may use confidence scores determined for both the close distances in the far distances. Using the techniques discussed with respect to FIG. 5, a value $C_{close}$ may be determined for the close distances, and a value $C_{far}$ may be determined for the far distances. The voxel may be included in step 212 when the following equation is satisfied: $C_{close} < \alpha \, C_{far}$, where $\alpha$ is a predefined bias value, or other predetermined degree. In this way, method 200 determines whether the voxel should be included in the merged three-dimensional model at step 212.

If the voxel is not included, the large negative distance may be stored in the voxel grid. That value may indicate the algorithm later on the voxel should not be included in the merged three-dimensional model. If the voxel is included (decision block 216), a signed distance is determined for the voxel at step 214. In addition to signed distance, a skilled artisan would recognize that weights may be used.

At step 214, the signed distance is determined for the voxel. The signed distance may be determined, for example, based on the distance measurements measured between the two threshold values discussed in steps 206 and 208. Distance values between those two thresholds indicate that the corresponding three-dimensional models are close to the voxel. The signed distance may be determined for example by averaging, or taking a weighted average, of the remaining distance values that are sufficiently close to the voxel. Examples of step 214 are illustrated with respect to distances 432 and 436 in FIG. 4A, and distances 482 and 484 in FIG. 4B.

In FIG. 4A, distances 432 and 436 are sufficiently close the voxel. In particular, those distances may be within the thresholds described earlier with respect to steps 206 and 208. To determine a signed distance for voxel 402, the distance values may be averaged. As illustrated in diagram 400, distance 436 indicates that voxel 402 is 2 meters below model 416, making for distance value of +2 m. Similarly, distance 432 indicates that voxel 402 is 3 meters above model 416, making for distance value of −3 m. The respective signed distance values may then be averaged, resulting in a weight for voxel 402 of −0.5. This signed distance 402 may be stored in the voxel grid or a signed distance field.

Similarly, in FIG. 4B, distances 482 and 484 are sufficiently close the voxel. In particular, those distances may be within the thresholds described earlier with respect to steps 206 and 208. To determine a signed distance for voxel 452, the distance values may be averaged. As illustrated in diagram 450, distance 482 indicates that voxel 452 is 2 meters below model 416, making for distance value of +2 m. Similarly, distance 484 indicates that voxel 452 is 3 meters below model 416, making for distance value of +3 m. The respective signed distance values may then be averaged, resulting in a signed distance for voxel 452 of +2.5. This signed distance 402 may also be stored in the voxel grid.

At decision block 218, steps 204-216 are repeated for each voxel in the voxel space constructed in step 202. As a result of this repetition, the voxel grid may include a signed distance value for each voxel. This three-dimensional matrix of signed distances may be used to construct a merged three-dimensional model at step 220. The merged three-dimensional model may be constructed by defining its edges based on values in the voxel grid. In an example, the edges may be defined between the voxels having positive values and voxels having negative values. Between the position between the positive and negative voxels, the positions of the edges may be defined based on the relative magnitude of the positive and negative values.

From the voxel grid, there may be several ways to extract a mesh surface. One example is use of the marching cubes algorithm. Another example of step 220 illustrated in FIG. 6.

Figure 6:
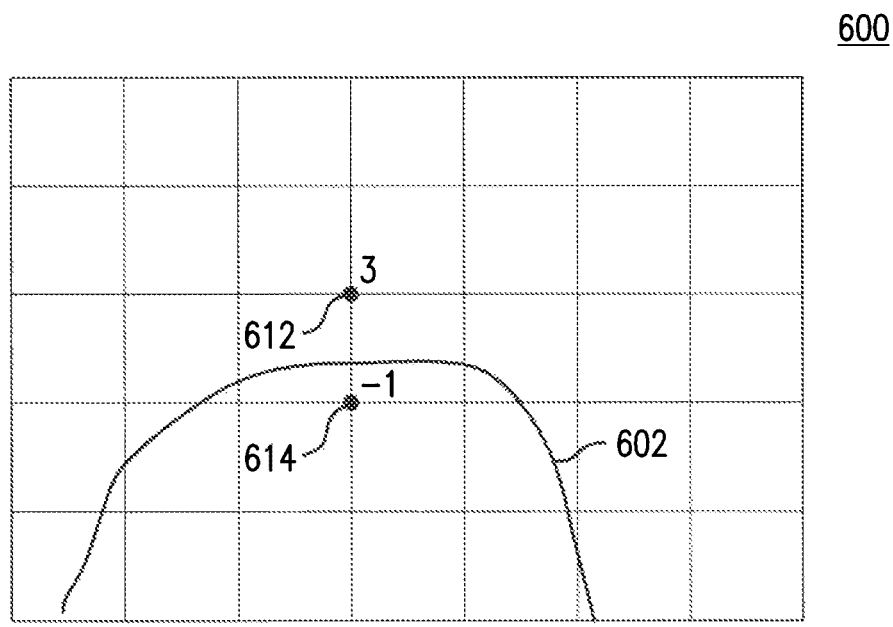
FIG. 6 is a diagram illustrating construction of a merged three-dimensional model from a signed distance field.

FIG. 6 shows a diagram 600 illustrating construction of a merged three-dimensional model 602 from a matrix of signed signed distances, according to an embodiment. In particular, diagram 600 illustrates a voxel grid having adjacent voxels 612 and 614. Because voxel 612 has associated positive signed distance (+3) and voxel 614 has associated negative signed distance (−1), three-dimensional model 602 constructed around between voxels 612 and 614. Further, because the magnitude of voxel 614's signed distance (1) is less than the magnitude of voxel 612's signed distance (3), three-dimensional model 602 may be constructed to run closer to voxel 614 than voxel 612. The position of three-dimensional model 602 between voxel 614 and voxel 612 may be linearly proportional to the respective signed distances. In this way, the merged three-dimensional model 602 may be determined using the voxel grid.

Figure 7:
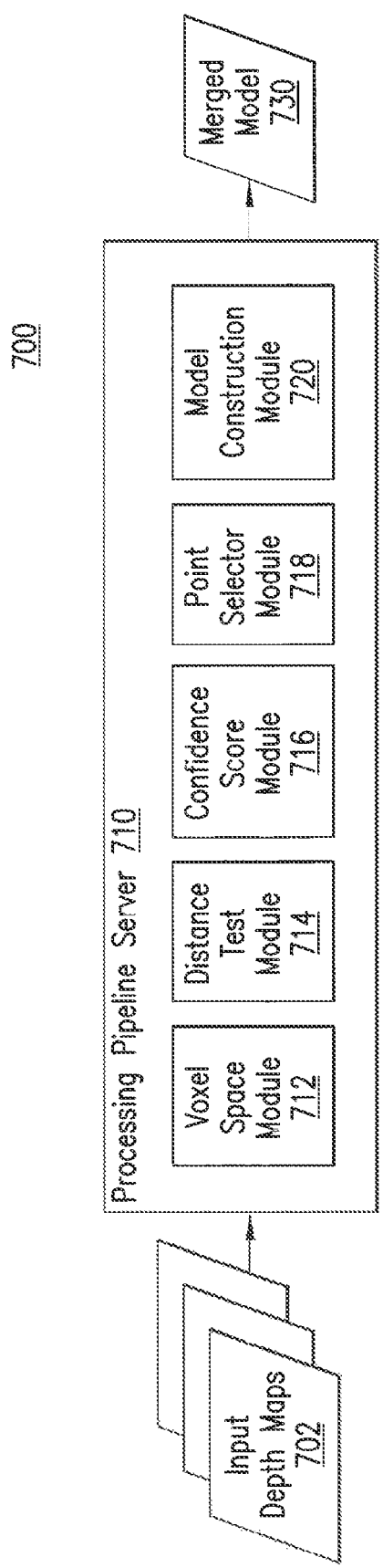
FIG. 7 is a diagram illustrating a system for merging depth maps, according to embodiments.

FIG. 7 is a diagram illustrating a system 700 for merging depth maps, according to embodiments. In an embodiment, system 700 may operate according to the method in FIG. 2. System 700 includes a processing pipeline server 710 that receives as input a plurality of input depth maps 702. While input three-dimensional models 702 are referred to as depth maps, a person of skill in the art would recognize that there are other ways to represent three-dimensional model data. For example, three-dimensional models 702 may also be represented as height fields. Each of three-dimensional models 702 may be stereo reconstructions from a particular perspective. From input three-dimensional models 702, processing pipeline server 710 generates a merged model 730.

Processing pipeline server 710 includes a voxel space module 712, a distance test module 714, a confidence score module 716, a point selector module 718 and a model construction module 720. Each of these modules is described below.

Voxel space module 712 is configured to determine a plurality of voxels in three-dimensional space. The voxels may be regularly spaced across the three-dimensional environment. Each voxel in the voxel grid may be evaluated independently as to whether it is part of the merged three-dimensional model. An example voxel space that may be produced by voxel space module 712 is illustrated in FIG. 3.

Distance test module 714 is configured to determine a plurality of distance values for respective voxels in the plurality of voxels. Each distance value may be a distance from a voxel to a three dimensional model from the plurality of input depth maps 702 along a perspective of a camera model used to generate the three-dimensional model. Examples of various measured distances are illustrated in FIGS. 4A-B.

Confidence score module 716 is configured to determine a confidence score for the respective distances determined by distance test module 714. The confidence scores may indicate a degree to which the perspective of the camera model of the corresponding three-dimensional model is oriented to face the voxel. Confidence score module 716 may be configured to determine the confidence score based on an angle between the three-dimensional model and a ray extending from the perspective of the input three-dimensional model through the voxel. Similarly, confidence score module 716 may be configured to determine the determining the confidence score based on a distance between samplings of the corresponding three-dimensional model in a proximity area determined according to the voxel. The proximity area may include pixels adjacent to the pixel that would display the voxel if rendered according to the virtual camera information. Confidence score module 716 may determine confidence values as described with respect to FIG. 5.

Point selector module 718 is configured to determine whether to include a point corresponding to the voxel into a merged three-dimensional model based, at least in part, on the determined confidence score.

Model construction module 720 is configured to determine a signed distance for the voxel according to both the first and second distance values. Further, model construction module 720 is configured to determine where, between two adjacent voxels, to construct an edge of the merged three-dimensional model based on determined signed distances for the two adjacent voxels. Operation of model construction module is described, for example, with respect to FIG. 6.

Processing pipeline server 710 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of voxel space module 712, a distance test module 714, a confidence score module 716, a point selector module 718, and module construction module 720 may be implemented in hardware, software, firmware, or any combination thereof.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for merging a plurality of three-dimensional models, each generated from images of a camera having a different viewpoint, comprising:
    (a) determining a plurality of voxels in three-dimensional space; for respective voxels in the plurality of voxels:
    (b) determining a plurality of distance values, each distance value being a distance from the voxel to a corresponding three dimensional model from the plurality of three-dimensional models along a perspective of a camera model used to generate the three-dimensional model;
    when (i) a first distance value from the plurality of distance values indicates that the distance between the voxel and the three dimensional model corresponding to the first distance value is within a threshold and (ii) a second distance value from the plurality of distance values indicates that the voxel is outside the threshold and above the three dimensional model corresponding to the second distance value:
    (c) determining a first confidence score indicating a degree to which the perspective of the camera model of the three-dimensional model corresponding to the first distance value is oriented to face the voxel;
    (d) determining a second confidence score indicating a degree to which the perspective of the camera model of the three-dimensional model corresponding to the second distance value is oriented to face the voxel; and
    (e) determining whether to include a point corresponding to the voxel into a merged three-dimensional model based, at least in part, on the determined first and second confidence scores such that, when the second confidence score is greater than the first confidence score by a predetermined degree, the voxel is not included in the merged three dimensional model.

2. The method of claim 1, wherein the determining (c) comprises determining the confidence score based on an angle between the three-dimensional model and a ray extending from the perspective of the camera model toward the voxel, such that a likelihood of the point being included in the merged three-dimensional model decreases as the angle becomes more acute.

3. The method of claim 1, wherein the determining (c) comprises determining the confidence score based on a distance between samplings of the corresponding three-dimensional model in a proximity determined according to the voxel, such that a likelihood of the point being included in the merged three-dimensional model decreases as the distance between samplings increases.

4. The method of claim 1, further comprising:
    (f) when (i) the point is determined in (e) to be included in the merged three-dimensional model and (ii) both a third and a fourth distance value from the plurality of determined distance values indicate that the distances between the voxel and the respective three dimensional models do not exceed the threshold, determining a weight for the voxel according to both the third and fourth distance values; and
    (g) determining where, between two adjacent voxels, to construct an edge of the merged three-dimensional model based on determined weights for the two adjacent voxels.

5. The method of claim 1, wherein each three dimensional model in the plurality of three-dimensional models is represented as a depth map.

6. The method of claim 1, wherein each three dimensional model in the plurality of three-dimensional models is represented as a height field.

7. The method of claim 1, wherein each three dimensional model in the plurality of three-dimensional models is a stereo reconstruction.

8. A system for merging a plurality of three-dimensional models each generated from images of a camera having a different viewpoint, comprising:
    one or more processors;
    a memory coupled to the one or more processors;
    a voxel determination module configured to determine a plurality of voxels in three-dimensional space;
    a distance test module configured to, for respective voxels in the plurality of voxels, determine a plurality of distance values, each distance value being a distance from the voxel to a three dimensional model from the plurality of three-dimensional models along a perspective of a camera model used to generate the three-dimensional model, wherein the distance test module is implemented on the one or more processors;

a confidence score module configured to, when (i) a first distance value from the plurality of distance values indicates that the distance between the voxel and the three dimensional model corresponding to the first distance value is within a threshold and (ii) a second distance value from the plurality of distance values indicates that the voxel is outside the threshold and above the three dimensional model corresponding to the second distance value:

determine a first confidence score indicating a degree to which the perspective of the camera model of the three-dimensional model corresponding to the first distance value is oriented to face the voxel, and determine a second confidence score indicating a degree to which the perspective of the camera model of the three-dimensional model corresponding to the second distance value is oriented to face the voxel; and a point selector module configured to determine whether to include a point corresponding to the voxel into a merged three-dimensional model based, at least in part, on the determined first and second confidence scores such that, when the second confidence score is greater than the first confidence score by a predetermined degree, the voxel is not included in the merged three dimensional model.

9. The system of claim 8, wherein the confidence score module is configured to determine the confidence score based on an angle between the three-dimensional model and a ray extending from the perspective of the camera model toward the voxel, such that a likelihood of the point being included in the merged three-dimensional model decreases as the angle becomes more acute.

10. The system of claim 8, wherein the confidence score module is configured to determine the confidence score based on a distance between samplings of the corresponding three-dimensional model in a proximity determined according to the voxel, such that a likelihood of the point being included in the merged three-dimensional model decreases as the distance between samplings increases.

11. The system of claim 8, further comprising:

a model construction module configured to: (i) determine a weight for the voxel according to both a third and a fourth distance values when the point is determined by the point selector module to be included in the merged three-dimensional model and both the third and fourth distance values from the plurality of determined distance values indicate that the distances between the voxel and the respective three dimensional models do not exceed the threshold, and (ii) determine where, between two adjacent voxels, to construct an edge of the merged three-dimensional model based on determined weights for the two adjacent voxels.

12. The system of claim 8, wherein each three dimensional model in the plurality of three-dimensional models is represented as a depth map.

13. The system of claim 8, wherein each three dimensional model in the plurality of three-dimensional models is represented as a height field.

14. The system of claim 8, wherein each three dimensional model in the plurality of three-dimensional models is a stereo reconstruction.

15. A computer program product including a non-transitory computer-readable medium having instructions stored thereon that, when executed by a computing device, cause the computing device to perform operations for merging a plurality of three-dimensional models each generated from images of a camera having a different viewpoint, the operations comprising:

(a) determining a plurality of voxels in three-dimensional space;

for respective voxels in the plurality of voxels:

(b) determining a plurality of distance values, each distance value being a distance from the voxel to a corresponding three dimensional model from the plurality of three-dimensional models along a perspective of a camera model used to generate the three-dimensional model;

when (i) a first distance value from the plurality of distance values indicates that the distance between the voxel and the three dimensional model corresponding to the first distance value is within a threshold and (ii) a second distance value from the plurality of distance values indicates that the voxel is outside the threshold and above the three dimensional model corresponding to the second distance value:

(c) determining a first confidence score indicating a degree to which the perspective of the camera model of the three-dimensional model corresponding to the first distance value is oriented to face the voxel;

(d) determining a second confidence score indicating a degree to which the perspective of the camera model of the three-dimensional model corresponding to the second distance value is oriented to face the voxel; and (e) determining whether to include a point corresponding to the voxel into a merged three-dimensional model based, at least in part, on the determined first and second confidence scores such that, when the second confidence score is greater than the first confidence score by a predetermined degree, the voxel is not included in the merged three dimensional model.

16. The computer program product of claim 15, wherein the determining (c) comprises determining the confidence score based on an angle between the three-dimensional model and a ray extending from the perspective of the camera model toward the voxel, such that a likelihood of the point being included in the merged three-dimensional model decreases as the angle becomes more acute.

17. The computer program product of claim 16, wherein the determining (c) further comprises determining the confidence score also based on a distance between samplings of the corresponding three-dimensional model in a proximity determined according to the voxel, such that a likelihood of the point being included in the merged three-dimensional model decreases as the distance between samplings increases.

18. The computer program product of claim 17, the operations further comprising:

(f) when (i) the point is determined in (d) to be included in the merged three-dimensional model and (ii) both a third and a fourth distance value from the plurality of determined distance values indicate that the distances between the voxel and the respective three dimensional model do not exceed the threshold, determining a weight for the voxel according to both the third and fourth distance values; and (g) determining where, between two adjacent voxels, to construct an edge of the merged three-dimensional model based on determined weights for the two adjacent voxels.

19. The computer program product of claim 15, wherein each three dimensional model in the plurality, of three-dimensional models is represented as a depth map.

20. The computer program product of claim 15, wherein each three dimensional model in the plurality of three-dimensional models is represented as a height field.

21. The computer program product of claim 15, wherein each three dimensional model in the plurality of three-dimensional models is a stereo reconstruction.

* * * * *